W. O. SNELLING.
COATING PROCESS AND APPARATUS.
APPLICATION FILED MAY 31, 1916.

1,310,037.

Patented July 15, 1919.

WITNESSES:
Fred H. Miller
J. R. Langley

INVENTOR
Walter O. Snelling
BY
Robson & S Brown
ATTORNEY

UNITED STATES PATENT OFFICE.

WALTER O. SNELLING, OF LONG ISLAND CITY, NEW YORK.

COATING PROCESS AND APPARATUS.

1,310,037.  Specification of Letters Patent.  Patented July 15, 1919.

Application filed May 31, 1916. Serial No. 100,846.

*To all whom it may concern:*

Be it known that I, WALTER O. SNELLING, a citizen of the United States, and a resident of Long Island City, in the county of Queens and State of New York, have invented a new and useful Improvement in Coating Processes and Apparatus, of which the following is a specification.

My invention relates to coating processes and apparatus, and has special reference to the production of imperforate coatings upon fragmentary material of a hygroscopic nature such, for example, as crystalline ammonium nitrate.

The general object of my invention is to provide a simple, effective and readily controllable process of producing uniform surface coatings upon granular material, together with suitable apparatus for carrying such process into effect.

Another and more specific object of my invention is to provide a process of individually coating ammonium nitrate crystals, and other hygroscopic substances, with waterproof coating materials such as nitronaphthalene. This application of my invention is of special utility in the manufacture of certain explosives which may contain both ammonium nitrate and nitronaphthalene as active ingredients.

Figure 1:
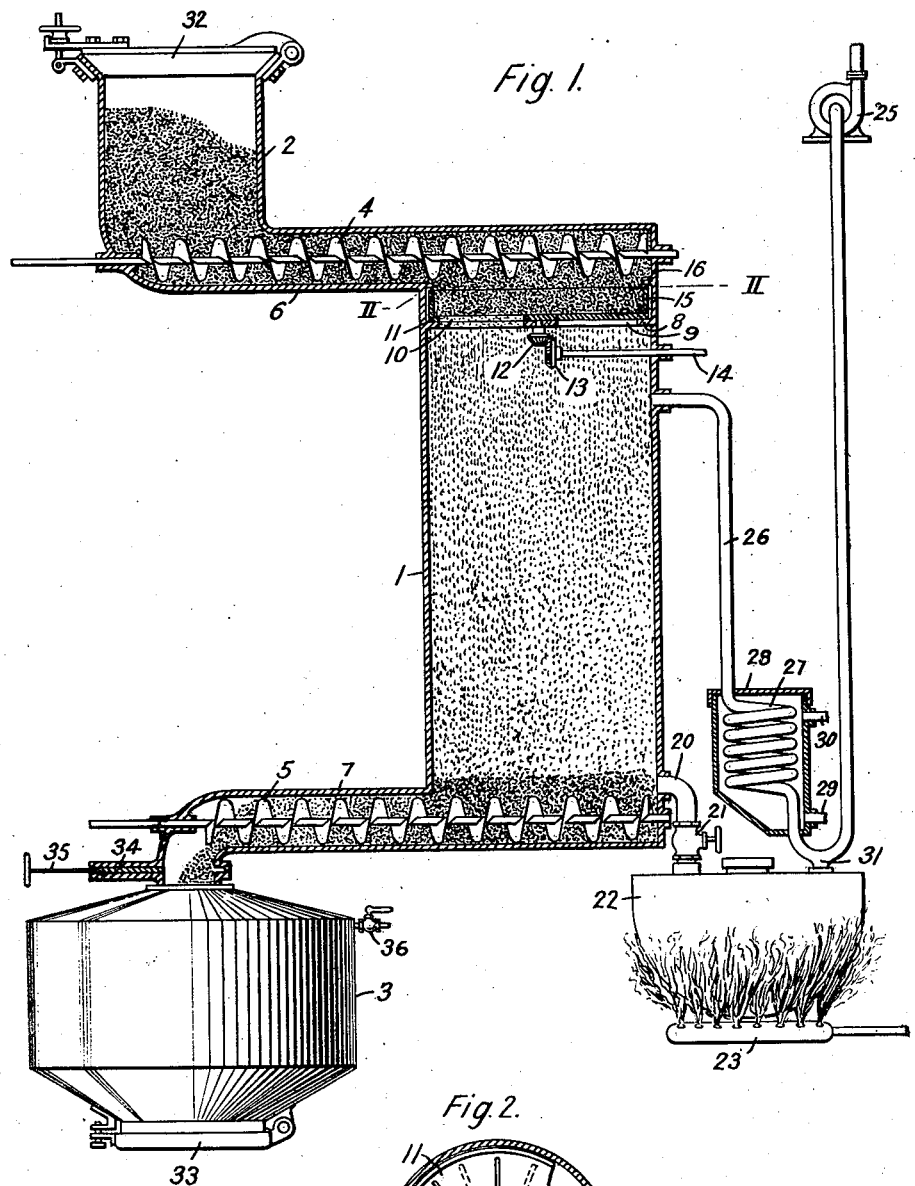
Figure 2:
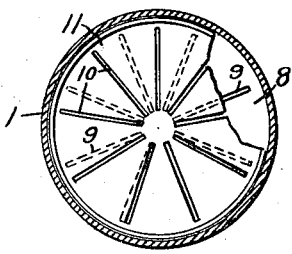

In the accompanying drawing, Figure 1 is a side view, partly in vertical section and partly in elevation, showing somewhat diagrammatically one form of apparatus suitable for use in practising my invention, and Fig. 2 is a horizontal sectional view of a portion of the structure of Fig. 1, the section being taken substantially along the line II—II, Fig. 1.

My invention consists broadly in applying coating materials in the form of condensable vapors instead of in liquid or semi-liquid form as is usual. Therefore, while I shall describe my process with specific reference to the coating of ammonium nitrate crystals with nitronaphthalene, it is to be understood that my invention is by no means limited to the use of these particular substances. The general procedure which I employ consists in vaporizing the coating material and bringing the resulting vapor into contact with the objects to be coated, which should preferably be cold enough to condense sufficiently thick layers of the coating medium upon their surfaces during a relatively brief treatment with the vapor. When masses of crystals or other granular or fragmentary materials are treated, I prefer to deposit the granular material in a treating chamber filled with the coating vapor, in such a way as to cause the grains to fall freely one or more times through the vapor, thus taking on individual and uniform coatings, the thickness of which depends upon the temperatures of the materials, the density of the vapor and the time of treatment, factors which may be readily controlled in accordance with the circumstances of each particular case.

Ammonium nitrate is a desirable ingredient in certain forms of explosives, but on account of its very hygroscopic nature it must be thoroughly protected from moisture. When the explosive is also to contain nitronaphthalene, it is customary to mix the ammonium nitrate with the nitronaphthalene, for the purpose of excluding moist air from the hygroscopic salt, by melting the nitronaphthalene and stirring the ammonium nitrate into the liquid mass until the grains of ammonium nitrate are covered with the nitronaphthalene. Under these conditions, many of the individual ammonium nitrate grains are not completely coated unless a very large proportion of nitronaphthalene is employed, and the use of such large amounts of nitronaphthalene is often undesirable.

By means of my present process, I am able to cover ammonium nitrate crystals with thin coatings of nitronaphthalene, using only a small percentage of the coating material. For this purpose, I may make use of the apparatus shown in the accompanying drawing, such apparatus comprising a circular tower or chamber 1, a receptacle 2 for the granular material to be treated, a second receptacle 3 for the coated product, and screw conveyers 4 and 5, inclosed in tubular casings 6 and 7, respectively, for transferring material from the receptacle 2 to the upper end of the tower 1 and for removing the coated grains from the bottom of the tower 1 to the receptacle 3.

The material delivered by the conveyer 4 should be caused to drop through the tower 1 in a regular and well scattered shower.

This may be accomplished, as shown, by closing the upper end of the tower with a circular plate 8 having radial slots 9, which are adapted to register at intervals with similar radial slots 10 in a rotatable circular plate 11 that rests upon the stationary plate 8 and is rotated by means of a gear 12 centrally attached to the plate 11 and meshing with a second bevel gear 13 secured to a driving shaft 14. The slots in the plates 8 and 11 are preferably unequal in number, in order that some of the slots may register to a greater or less extent at all times, thus producing regular delivery of the granular material. The rotating plate 11 is provided with a peripheral flange 15, which moves beneath an annular flange 16 secured to the inner wall of the tower 1, this arrangement insuring that the material delivered by the conveyer 4 shall be properly deposited upon the plate 11.

Vapors of nitronaphthalene or other suitable coating material are introduced into the tower 1 through a pipe 20, controlled by a valve 21 and communicating with a vaporizing vessel or still 22 which is provided with a suitable heater 23 and which may contain commercial nitronaphthalene, consisting chiefly of a-mononitronaphthalene and boiling at about 304° C. This material begins to decompose at approximately its boiling point, and for this reason, the system including the tower 1, the receptacles 2 and 3, the conveyer tubes 6 and 7, and the vaporizer 22 is preferably maintained under subatmospheric pressure, the pressure being reduced sufficiently to lower the boiling point of the nitronaphthalene well below its decomposing temperature. In the system shown herein, the necessary reduced pressure is maintained by means of a suction pump 25 which communicates with the interior of the tower 1 through a pipe 26.

The supply of nitronaphthalene vapors should be so regulated with respect to the amount of ammonium nitrate being treated, that as much of the vapor as possible is condensed upon the crystals. However, some of the vapor will necessarily be withdrawn through the exhaust pipe and in order to recover this vapor, I interpose in the pipe 26 a condensing worm 27 inclosed in a casing 28 in which a cooling fluid may be circulated through inlet and outlet pipes 29 and 30. This circulating fluid must not be so cold as to solidify the nitronaphthalene in the condensing worm, and I therefore prefer to employ hot water for this purpose. The liquid nitronaphthalene condensed in the worm 27 flows into the vaporizer 22 through a short drain pipe 31 attached to the lower bend of the exhaust pipe 26.

The feeding receptacle 2 is preferably provided with a tightly fitting cover 32 and the discharge receptacle 3 is also provided with a suitable closure 33. The connection between the latter receptacle and the discharge conveyer tube 7 is preferably regulated by means of a suitable valve, in order that coated material may be removed from the receptacle 3 without destroying the partial vacuum in the remainder of the system. As shown, this valve consists of a plate 34 slidably supported just above the inlet of the receptacle 3 and controlled by means of a handle 35. The discharge receptacle may also be provided with a valve 36 for admitting air to the receptacle when it is desired to open the door 33.

In the operation of the above-described apparatus to treat ammonium nitrate crystals with nitronaphthalene, the cold ammonium nitrate, in as dry a condition as possible, is placed in the receptacle 2, heat is applied to the vaporizer 22, and the suction pump 25, the screw conveyers 4 and 5 and the driving shaft 14 of the distributer plate 11 are all set in motion. The nitrate crystals are fed into the tower 1 in an evenly-distributed shower, and as they fall, they condense the nitronaphthalene vapor in thin layers upon their surfaces. The coated grains are then conveyed to the discharge receptacle 3, either directly and without further treatment or through an air blast or other suitable chilling means, if such chilling is found to be necessary in order to complete the solidification of the nitronaphthalene coatings. It may be found desirable to chill the ammonium nitrate crystals before introducing them into the treating chamber, in order that coatings of greater thickness may be formed. It may also be found desirable to dilute the vapor within the treating chamber with nitrogen or some other inert gas, if particularly thin coatings are desired.

The treating chamber 1, instead of being a stationary tower, as shown, may take the form of a rotating drum, of the form well known in tumbling and drying apparatus, the granular material and the coating vapor being introduced axially into the drum and the grains being turned over repeatedly in their passage through the drum, which may be inclined toward its discharge end and may be provided with suitable stirring baffles in a well known manner.

As I have indicated above my invention is not confined to the coating of ammonium nitrate crystals or to the use of nitronaphthalene as the coating material; nor are the specific forms of apparatus which I have shown and described the only forms which may be employed within the limits of my invention. Sodium nitrate, as a further example, may be prepared for the manufacture of dynamite or black blasting powder by applying coatings of naphthalene, nitronaphthalene or the like, according to the foregoing process, and grains of ordinary black powder may be similarly coated with protective materials, suitable precautions being taken, by reducing the pressure on the vapor or otherwise, to insure that the temperature of the vapor is well below the ignition point of the powder. It will thus be evident that numerous variations both in materials, apparatus and process steps may readily be devised by persons skilled in the art, and I therefore desire that no limitations be imposed upon my invention except such as are indicated in the appended claims.

I claim as my invention:

1. The process that comprises treating a hygroscopic crystalline substance with a vaporous coating material.

2. The process that comprises treating a hygroscopic fragmentary material with a vaporous coating material under such conditions as to produce substantially uniform solid coatings thereon.

3. The process that comprises artifically cooling a solid substance and treating the cooled substance with a vaporous coating material.

4. The process that comprises artificially cooling a fragmentary hygroscopic substance and treating the cooled substance with a vaporous coating material.

5. The process that comprises causing a hygroscopic fragmentary substance to fall freely through a vaporous condensable coating material.

6. The process that comprises causing a hygroscopic fragmentary substance to fall freely through a vaporous coating material the solidifying temperature of which is higher than the temperature of the said substance.

7. The process that comprises treating a hygroscopic substance with a vaporous coating material under subatmospheric pressure.

8. The process that comprises treating a hygroscopic crystalline substance with a vaporous coating material under sub-atmospheric pressure.

9. The process that comprises treating a fragmentary hygroscopic substance with a vaporous coating material diluted with an inert gas.

10. The process that comprises treating a hygroscopic substance with nitronaphthalene vapor.

11. The process that comprises treating a hygroscopic substance with nitronaphthalene vapor under subatmospheric pressure.

12. The process that comprises causing a hygroscopic substance to fall freely through nitronaphthalene vapor.

13. The process that comprises treating a hygroscopic substance with nitronaphthalene vapor maintained at a temperature below the decomposing temperature of nitronaphthalene.

14. The process that comprises treating crystalline ammonium nitrate with a vaporous coating material.

15. The process that comprises causing crystalline ammonium nitrate to fall freely through a vaporous coating material.

16. The process that comprises treating crystalline ammonium nitrate with nitronaphthalene vapor.

17. The process that comprises causing crystalline ammonium nitrate to fall freely through nitronaphthalene vapor.

18. The process that comprises treating crystalline ammonium nitrate with nitronaphthalene vapor under subatmospheric pressure.

19. The process that comprises vaporizing a normally solid coating material that decomposes at approximately its normal boiling point, under subatmospheric pressure sufficiently low to substantially reduce the said boiling point, and bringing the resulting vapor into contact with the material to be coated.

20. The process that comprises vaporizing nitronaphthalene under subatmospheric pressure sufficiently low to substantially prevent decomposition of the nitronaphthalene, and bringing the resulting vapor into contact with crystalline ammonium nitrate.

21. Apparatus for coating fragmentary material comprising a treating vessel, means for causing the material to be coated to fall therein, means for vaporizing a coating material and for introducing the resulting vapor into the said vessel, and means for maintaining both the material being vaporized and the said vessel under subatmospheric pressure.

22. Apparatus for coating fragmentary material comprising a treating vessel, a feeding hopper communicating with the top of the said vessel, a receiving receptacle communicating with the bottom of the said vessel, means for conveying fragmentary material from the said feeding hopper to the said treating vessel and from the said treating vessel to the said receptacle, means for vaporizing a coating material and for introducing the resulting vapor into the said vessel, and means for maintaining the said treating vessel, hopper, receptacle and vaporizing means under subatmospheric pressure.

23. Apparatus for coating fragmentary material comprising a treating vessel, a hopper, a conveyer for bringing fragmentary material from the said hopper to the top of the said treating vessel, and a feeding device disposed at the top of the said treating vessel and comprising two superposed and perforated disks, the said disks being relatively movable to progressively bring the perforations in the said disks into alinement.

24. Apparatus for coating fragmentary material comprising a treating vessel, a hopper, a conveyer for bringing fragmentary material from the said hopper to the top of the said treating vessel, and a feeding device disposed at the top of the said treating vessel and comprising two superposed and radially slotted disks, the said disks being relatively movable to progressively bring the slots in the said disks into alinement.

In testimony whereof, I have hereunto subscribed my name this 25th day of May, 1916.

WALTER O. SNELLING.